United States Patent

[11] 3,560,740

[72] Inventor Russell Maurice Tripp
Saratoga, Calif.
[21] Appl. No. 565,227
[22] Filed July 14, 1966
[45] Patented Feb. 2, 1971
[73] Assignee Tripp Research Corporation
Saratoga, Calif.
a corporation of Delaware

[54] DEPTH-PERCEPTION RADIOGRAPHY
14 Claims, 3 Drawing Figs.
[52] U.S. Cl. ................................................. 250/61, 250/65
[51] Int. Cl. .................................................. G01n 23/04, H01j 37/22
[50] Field of Search .......................................... 250/61, 65

[56] References Cited
UNITED STATES PATENTS
2,492,520   12/1949   Bonnet ..................... 250/61X FOREIGN PATENTS
449,213   6/1936   Great Britain ................ 250/61

Primary Examiner—William F. Lindquist
Attorney—Gregg & Hendricson

ABSTRACT: The invention described and claimed herein is a method and apparatus for producing a picture of an opaque three-dimensional subject in which the picture conveys to the unaided eyes of the observer the true spatial relationship of the internal and external elements of the subject. Specifically, the invention provides for relative rotation between a subject and the combination of a radiation source and plane transducer to produce photographic light that is scanned through a narrow aperture across a displacement grid in front of a film plane. The foregoing produces a photograph that upon direct viewing through the displacement grid conveys full internal as well as external depth perception.

PATENTED FEB 2 1971

3,560,740

INVENTOR.
RUSSELL MAURICE TRIPP
BY
Lippincott, Ralls & Hendricson
ATTORNEYS

DEPTH-PERCEPTION RADIOGRAPHY

The present invention relates in general to method and apparatus for producing photographs of three-dimensional objects which may be opaque to visible light; and operates in such a manner as to make it possible for an observer to perceive the spatial relation between various points throughout the object, as though he were viewing a transparent three-dimensional model of the object. The present invention produces a two-dimensional picture that need only be viewed with the unaided eye; and, such picture differs from the usual stereoscopic photographs in that when the viewer scans the picture there is observed a changing parallax effect, just as though the original three-dimensional object were being scanned rather than a two-dimensional projection thereof. In the following description of the present invention, the term "radiography" is taken in its broadest sense to mean the production of radiographs by any suitable type of penetrating radiation as set forth below and is in no way limited to x-rays.

The art of closely related stereoscopic photography is quite old; and, more recently, this art has been applied to x-ray photography, particularly in the field of dentistry. Following early work by H. E. Ives, disclosed in part of U. S. Pat. No. 1,916,320, considerable advances were made in the field by M. Bonnet, as disclosed and claimed, for example, in U. S. Pat. No. 2,506,131 and U. S. Pat. No. 2,492,520. It is taught by Bonnet that a "selectograph" and light-sensitive plate shall be rotated simultaneously with an object to be photographed; and, various mechanisms have been disclosed by both Bonnet and subsequent workers in the field for accomplishing the desired motions. Certain of these subsequent developments are disclosed and claimed in U. S. Pat. No. 2,521,154 to Dudley, in U. S. Pat. No. 2,684,446 to Paatero and U. S. Pat. No. 3,045,118 to Hollman et al. An interesting alternative approach to the problem is presented in U. S. Pat. No. 3,106,640 to Oldendorf; and, in addition, numerous advances in the general field have been provided by Winnek, as exemplified in U. S. Pat. No. 2,562,077. The aforementioned prior art workers have materially advanced the state of the art; but, to date, there apparently remains to be developed a truly practical three-dimensional process and apparatus for depicting the spatial relationship of internal portions of an opaque object.

The present invention does provide a truly practical process and apparatus embodying much of the teaching of the prior art, as exemplified above, by incorporating certain highly important limitations and improvements which extend the art to the point of true practicality for widespread application and utilization. The present invention is in no way limited to the utilization of x-rays; but, instead, is applicable with any type of penetrating radiation that is, in part, attenuated or affected by a three-dimensional object to be examined, with such attenuation or affect being proportional to the path length through the material. Furthermore, the present invention is in no way limited to utilization upon human objects, but is equally applicable for all types of industrial testing as, for example, in the detection of casting flaws or the like.

In brief, the present invention employs a source of radiant energy or penetrating particles having the property of being partially absorbed, attenuated, diffused, dissipated or altered in some manner by passage through a three-dimensional subject in proportion to the path length traversed and certain chemical or physical properties of the material along the path. The invention provides for the direction of radiant energy upon a subject, and interception of the propagated energy on the opposite side of the subject by a two-dimensional transducer surface disposed approximately normal to the axis of propagation of the radiant energy for intercepting such energy or particles after they have traversed the subject, and producing actinic energy from an output face of the transducer. The intensity of actinic energy or photographic light emerging from each point on the output face of the transducer is proportional to the incident energy at each and every corresponding point upon the input surface of the transducer. The invention, in addition, provides for a permanent recording of the relative intensity of energy distribution over the two-dimensional surface of a transducer at successive instants in such a manner that the instantaneous magnitude of intensity at any point be determined at some later time independently of the magnitude of the intensity at other instants during the recording. More specifically, the invention provides for photographing through a narrow slit aperture which is changing its position relative to the recording surface such that the normal from the aperture to the recording surface is changing its angle of incidence to the recording surface synchronously with the changing display in the transducer output screen. Furthermore, the recording surface consists of a photographic emulsion applied to the backside of the film base which has the front side thereof embossed, preferably with parallel cylindrical lenses, although parallel prisms or closely spaced spherical lenses may be employed. The lenses or prisms affect refraction of the light falling thereon to a particular portion of the sensitive emulsion, and the location of such portion is dependent upon the angle of incidence of the ray from the slit aperture to the film surface. As the angle of incidence changes during a recording, the instantaneous line image behind each prism or lenticulation is displaced laterally, and, therefore, does not interfere with the previously recorded data. In the preferred instance where the front side of the film is embossed with lenses, they will focus an image of the slit aperture onto the emulsion surface. It is to be appreciated that the subject being photographed is rotated during photography so as to present differing radiation patterns upon the input face of the transducer. In the majority of applications the invention provides for relative rotation between the subject and the portion of the apparatus including the source of radiation and transducer, so as to display varying radiation patterns on the input face of the transducer. In other applications the subject may internally move or change so that the invention itself need not provide the motion, but yet records successive separate pictures on a single film.

One of the difficulties in providing a truly practical depth-perception radiograph is the inherent limitation upon the amount of light available to expose the film. If the camera aperture is sufficiently large to have the effect of supplying the light rays simultaneously across the full acceptance angle of the embossed lenticulations, then the full width of emulsion surface behind each lenticulation is exposed to each relative position of the aperture with respect to the recording film, and there remains no unexposed surface to record succeeding instantaneous images appearing on the transducer output screen at a later instant. The successful practice of the present invention, therefore, necessitates employing a very small aperture, but in doing so, the light-gathering effectiveness is greatly reduced; and, in some cases this may mean that in order to obtain sufficient exposure to produce a readable picture, the subject must absorb an excessive amount of radiation. In medical diagnostic radiology, for example, the patient exposed to x-rays may absorb more damaging radiation than what is considered a safe, allowable dosage.

In order to overcome the above-noted difficulty, the present invention employs a camera in which the usual disc aperture is replaced by a slit aperture having the same width as the appropriate disc diameter, but a much greater light-transmission area; and, furthermore, the present invention provides for improving the overall efficiency with which the incident energy is absorbed and converted to actinic energy and intensified. Such an improvement in transducing may be accomplished by means such as the x-ray transducer disclosed and claimed in my copending patent application Ser. No. 399,792, filed in the U. S. Pat. Off. on Sept. 28, 1964 now abandoned.

According to the present invention, the procedure to record depth-perception photographs of a three-dimensional object which is opaque to light is accomplished by casting a changing "shadow" of the three-dimensional object onto a two-dimensional surface by relative rotation of the subject and the radiation source-projection surface combination (the latter of which are rigidly fixed with respect to one another). The changing shadowfimage is photographed by a camera having a slit aperture that is parallel to the axis of cylindrical lenticulations embossed on the film face opposite the emulsion. The narrow beam of light from the slit aperture is refracted by the embossed lenticulations and focused onto narrow strips of emulsion behind the lenticulations at a position determined by the angle of incidence from the aperture to the film plane. By varying the angle of incidence synchronously with the rate of change of the image on the projection surface, the continuous succession of changing images are displaced laterally rather than falling one on top the other, so as to preclude the blurring that would otherwise result. When the resultant photograph is viewed through the side with the embossed lenticulations, and with the axis of the lenticulations vertically disposed, each eye of the viewer will see the particular image on the film corresponding to the angle of incidence that the eye makes with the film. The lenticulation, in turn, will magnify the elementary strip exposure to fill the entire lenticulation width and match with the corresponding exposure elements behind the adjacent lenticulations. When the observer's eyes scan the photograph so as to change the angle of incidence the line-of-sight makes with the photograph, different views will be perceived by both eyes and since the line-of-sight from each eye is slightly different, the images on each retina will be slightly different and the condition of retinal disparity for producing depth perception is satisfied.

The present invention is illustrated, both as to method and apparatus, in the accompanying drawing wherein.

Considering first the method of the present invention, there is employed a source of penetrating radiation disposed on one side of a relatively opaque subject to be photographed. The radiation employed herein is capable of passing through the subject while being affected by such passage, either in the manner of attenuation, diffusion or the like in relation to the radiation path length through the object and chemical or physical properties of the subjects or portions thereof. On the opposite side of the subject there is provided a transducer for intercepting the radiant quanta passing through the object, and for producing actinic photons therefrom. Commonly, this transducer produces a visible light, but the light may be of any wavelength most suitable for recording. Radiation incident upon one side of the transducer produces actinic radiation from the other side thereof in proportion at each point thereon to the intensity of incident radiation. It will be appreciated that the visible or actinic light emanating from the transducer travels outwardly from each point thereon in diverging rays; and the present invention operates to mask out or block all but a selected beam of this light which can pass through a narrow slit. The restricted beam of light diverging through the narrow slit is caused to impinge upon the lenticulations at the film plane with a continuously varying angle of incidence. The light falling on the lenticulations, in addition to being focused into a thin line on the sensitive emulsion behind each of the lenticulations, is refracted laterally by an amount dependent upon the instantaneous angle of incidence of the beam on the lenticulations. This progressive lateral displacement of the line image across the emulsion area behind each lenticulation makes possible the sequential recording of a changing scene without the successive instantaneous images interfering. The progressive lateral displacement of the line images in the emulsion can be accomplished by lateral translation of a slit aperture between the camera objective and photographic medium, as explained in more detail below, by lateral translation and rotation of the camera objective and slit aperture as a rigid unit, or may also be accomplished by rotating the plane of the photographic film about an axis corresponding to one of the cylindrical lenticulations while objective and aperture remain fixed. In all instances there occurs some relative motion between the subject and the rigidly related source of radiation and transducer input surface, so that a changing view of the subject is appearing on the transducer output. There are certain advantages to be achieved by each of the above schemes for varying the angle of incidence of the light from the aperture onto the recording film, but the obtaining of a successful photograph having depth-perception characteristics is dependent in all cases on employing an aperture which subtends a very small angle at the film plane.

Figure 1:
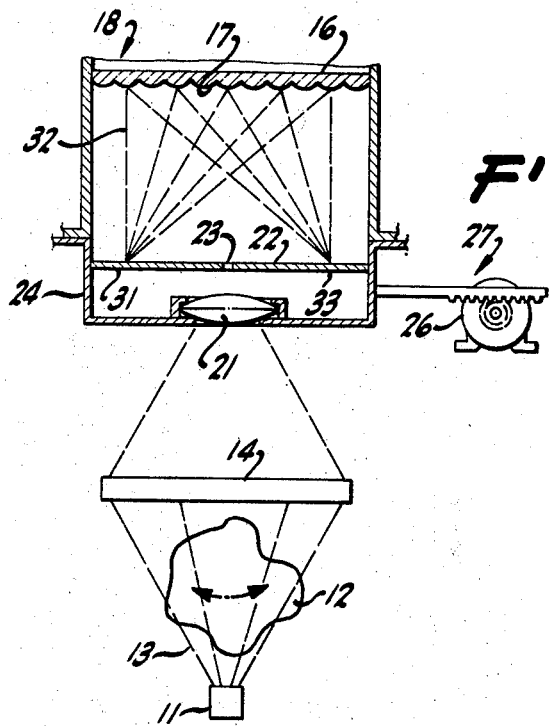
FIG. 1 is a schematic illustration of one embodiment of the present invention.

Considering now particular preferred embodiments of the apparatus of the present invention, reference is made to FIG. 1 of the drawing wherein there is illustrated the radiation source 11 disposed on one side of a subject 12 to be photographed, and directing penetrating radiation 13 thereon. The source 11 may produce energy that is sonic, ultrasonic, visible light, ultra-violet light, infra-red, radio frequency emanations, x-rays, gamma rays, nuclear particles and the like. The subject 12 is neither totally transparent nor totally opaque to the radiation 13 which is being employed, and the three-dimensional subject 12 partially absorbs, attenuates, diffuses, dissipates or alters on passing therethrough the radiation, such that the emergent radiation, after passage through the object, has the energy thereof affected in proportion to the path length traversed and the chemical or physical properties of the subject in the path of radiation. Immediately on the opposite side of the subject from the source 11 there is disposed transducer 14 which intercepts the energy or particles after they have traversed the subject; and, while detecting the relative intensity of energy received at each point on the surface thereof, transforms this energy so detected into photographic light. The transducer 14 may also intensify the energy in the form of light, so as to maximize the intensity of light emanating from the opposite side of transducer 14. In this respect it is noted that one of the prior art difficulties in applying techniques of this sort to medical radiography was the difficulty of obtaining sufficient light to adequately expose photographic film without overexposing the subject to damaging radiation. Certain prior art approaches to this problem have involved the utilization of wide-aperture photography which, however, in part, defeats the purpose in that successive instantaneous images are not individually retrievable.

In accordance with the present invention, and, again, as illustrated in FIG. 1, there is provided a film plate 16 or the like which may be of conventional composition and which is provided on the surface facing the camera objective with lenses or prisms capable of refracting the light falling thereon in a lateral direction depending upon the angle of incidence of the light ray from the objective aperture to the film plane, thereby permitting a continuous succession of images to be recorded by changing the angle of incidence and without interference between successive images. This front surface 17 may take the form of small parallel cylindrical lenses, parallel prisms or closely spaced spherical lenses. With cylindrical lenses or lenticulations only a small portion of the cylindrical circumference is employed in each lenticulation. The radius of curvature and the arc width is determined by well-known laws of geometrical optics relating radius of curvature, index of refraction, film thickness and f/number of camera objective. In general, this surface is illustrated in FIG. 1 as a lenticulated surface, and the entire photosensitive media, including the embossed surface, is herein denominated by the numeral 18. It is to be appreciated that the lenticulations 17 or the like of the photographic medium serve to focus the light impinging thereon to a line of light on the film itself behind the lenticulation. Consequently, it may be considered that the front surface or lenticulations of the photographic medium comprises a displacing grid.

In accordance with the present invention, the provision is made for varying the angle of incidence with which light strikes the grid or lenticulations; and, this variation is synchronized with the changing view that appears in the transducer output face. Consequently, successive instantaneous views are recorded in juxtaposition or as a continuously varying image upon the film. As shown in FIG. 1, there is provided an objective lens 21 mounted together with and in front of a plate 22 having a slit aperture 23 therein. The objective lens 21 and plate 22, together with support structure, is herein formed as a moveable element 24 mounted for controlled translation laterally across the path of light from the transducer 14 to the photographic medium 18. This translation may be accomplished manually or by a power source such as a small electric motor 26 operating a rack-and-pinion 27, for example. No attempt is made herein to illustrate details of mounting or bearings, inasmuch as conventional mechanical elements and connections may be employed therefor. It will be seen in FIG. 1 that a relatively small objective lens 21 may be employed in this particular embodiment of the invention, with the slit aperture 23 disposed immediately behind the center of such lens. It will be apparent to anyone skilled in photographic techniques that, if the distance between objective 21 and transducer 14 is small, a coordinated rotational motion of the entire camera about the transducer will be required in order to keep the transducer output screen in view: If the distance is relatively large, no such coordinated rotation is required.

Now with regard to the accomplishment of depth-perception radiography, it is to be appreciated that the planar transducer emits light having an intensity at each point of the output face proportional to the intensity of incident radiation on the corresponding point of the input face. The present invention operates to obtain instantaneous images upon the photographic medium which are displaced laterally, rather than superposed upon one another, by varying the angle that a light beam coming from a narrow slit at the objective impinges upon the photographic medium in synchronization with a changing view of the subject on the transducer output screen resulting from the subject rotating in the path of a radiation beam falling on the input screen of the transducer.

Further to the foregoing, it will be noted that with the objective 21 and aperture 23 disposed to the left in FIG. 1, so that the aperture might appear at the point 31, for example, light rays 32 transmitted through the aperture will impinge upon each lenticulation 17 at some particular angle from the point 31. Such light at each lenticulation is then focused into a single line on the emulsion behind the lenticulation. As the objective and aperture are moved laterally, the angle at which light is directed upon the lenticulations continually changes; and, thus, the position of the line behind the lenticulation is changed. This continues until the aperture is disposed at the right of FIG. 1, for example at point 33, wherein it will be seen that light rays impinge upon the lenticulations of the film at a much different angle than when they emanated from the aperture position 31.

Thus, lateral movement of the aperture and objective in this embodiment of the present invention provides for successive recording of separate and distinct lines behind each lenticulation, and this lateral motion may be accomplished in either a continuous or stepwise fashion. With rotation of the subject 12 during lateral motion of the aperture and objective, there are, thus, recorded upon the film a plurality of separate images of the subject in the form of successive lines behind individual lenticulations. Only a minute portion of the film emulsion is exposed at any one aperture position, i.e., only a thin, vertical line of the emulsion is exposed behind each lenticulation for each aperture position; and successively different aperture positions laterally across the apparatus expose successive, but separate, lines behind each lenticulation.

As a consequence of the foregoing, the present invention provides for retrieval of the separately recorded images, for a viewer will "see" a different image at each different angle of viewing of the developed film. While lenticulations serve to focus incident light into a line behind each lenticulation with the position of the line being determined by the angle of incident light, these lenticulations also serve to expand one individual line behind each lenticulation to cover the entire lenticulation surface to a viewer, with the line exposed being determined by the angle of viewing. The invention, therefore, is seen to provide for successive recording of individual retrievable images.

It is to be appreciated that lateral translation of the position from which the transducer light is focused upon the photographic medium is synchronized in some manner with the rotational motion of the subject 12. In accordance with prior art teaching, the relative movements may be directly synchronized for a true perspective depiction of the subject, or, alternatively, variations in relative movements may be made to either emphasize or minimize depth perception. It is to be further noted that the invention provides for the utilization of an elongated, narrow slit aperture for the transmission of light from the objective 21 onto the photographic medium. Of course, the objective lens is disposed in appropriate position to focus light from the transducer onto the photographic medium. Of particular importance herein is the utilization of the elongated slit aperture to thereby minimize the lateral extent of transducer viewing while maximizing the amount of light that can be transmitted to the photographic medium. This serves to sharply focus the successive images upon the photographic medium in juxtaposition, so that they may be later individually retrieved by different angular viewing of the developed film through the displacement grid or lenticulations 17 without confusion between separate images. This furthermore provides for maximization of the light transmittal to the film so that good resolution is obtained. Apparently various prior art workers in the field have found it necessary to employ wide openings, in order to focus a sufficient amount of light on the film to develop a picture therefrom; and, even though such a procedure is feasible where a depth-perception picture is to be taken of a three-dimensional object illuminated with visible light, as opposed to the case herein where a picture is to be taken of a "shadow" which has been cast by a three-dimensional object onto a two-dimensional surface, it makes it impossible to avoid integrating the successive instantaneous images, and, therefore, prevents their separable retrievability. Furthermore, the present invention employs a highly efficient transducer 14 which not only faithfully transduces incident radiation into emergent light, but, additionally, intensifies the energy of emergent light. Reference is again made to my above-identified copending patent application for a highly advantageous transducer that may be employed in this respect.

Figure 2:
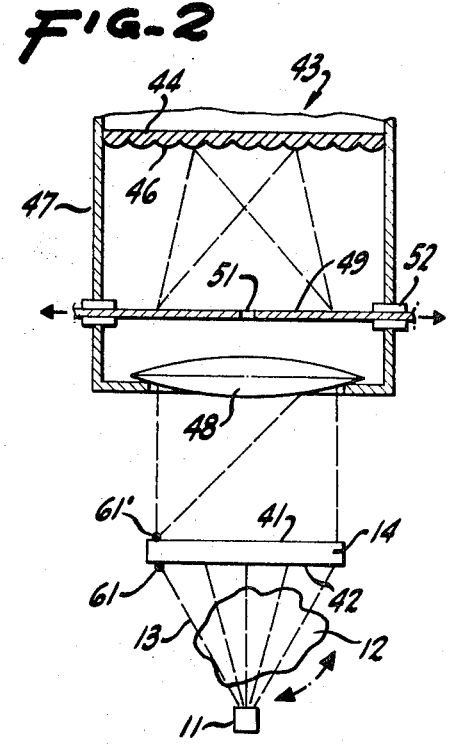
FIG. 2 is a partial schematic illustration of the lens and film end of an alternative embodiment of the present invention; and, FIG. 3 is a schematic illustration of yet another embodiment of the present invention.

Reference is now made to FIG. 2 illustrating an alternative embodiment of the present invention, and wherein there is illustrated a transducer 14 having an output face 41 from which photographic light emanates in proportion to radiation incident upon an entrance face 42 thereof. This relationship between incident radiation and emergent light is directly proportional for each point along the surface of the transducer. A photographic medium 43 is illustrated to include a film 44 which has suitable refracting lenticulations embossed on the surface toward the camera objective and a sensitive emulsion on the opposing surface. This embossed displacement grid may, for example, comprise elongated transparent lenticulations of cylindrical form as shown. In this embodiment of the present invention a housing at 47 removably supports the photographic medium 43, and carries at the front thereof an objective lens 48 displaced from the photographic medium an appropriate distance, so that light incident upon the objective lens is focused upon the photographic medium. Additionally, the invention, as illustrated in FIG. 2, includes a laterally moveable plate 49 having an elongated slit aperture 51 therein. This plate may be mounted in suitable bearings 52 or the like, so as to be sealed in lighttight relation to the housing and yet moveable to the walls thereof. Appropriate means exteriorly of the housing may be employed for lateral translation of the plate 49 in either a continuous motion or in stepwise fashion. Mechanical motion means for the plate 49 are not illustrated, inasmuch as a wide variety of conventional arrangements may be utilized for this purpose. Any motion of the subject will cast changing "shadows" on the transducer input so as to produce successive images on a single film. In this way it is possible to record motion or articulation of the subject on a single piece of film so that the motion may be reenacted by the viewer at will by visually scanning the film from different angles. For instance, a "manic" of the heart action of a subject might be x-ray photographed on a single film format and later reviewed by rotating the film about a lenticular axis in front of the viewer. In this embodiment of the present invention, it will be seen that the intensity of radiation incident upon a point 61 of the transducer will vary as the subject 12 is rotated, dependent upon the path length of radiation through the subject and the chemical or physical properties of the subject. Consequently, the intensity of light emitted from a point 61' on the exit face of the transducer 14 will vary in direct relationship to the intensity of incident radiation at the point 61. A plate 49 is moved laterally across the objective lens, either in front or in back thereof, so that only that portion of the light emanating from point 61' which passes through the aperture slit 51 when it is in a given position will reach the refracting lenticulation, and the angle at which it is incident upon the lenticulation will be determined by the position of the aperture slit 51 at that moment, which, in turn, will influence the amount of lateral displacement of the strip image on the sensitive emulsion. It will thus be seen that as the slit aperture 51 of the plate 49 is moved transversely across the objective 48, the light from the transducer exit surface which is able to pass through the aperture slit will be focused on the lenticulated surface of the film by the camera objective. Each lenticulation will, in turn, focus the light falling thereon to a strip of the emulsion behind the respective lenticulations and displaced laterally from the medial zone, depending upon the angle at which the light from the slit strikes the lenticulation.

The maximum angle of incidence of light from the slit aperture to the lenticular surface is established by conventional geometric optic principles, which are well known, relating the focal distance of the objective, its magnification ratio, diameter of the objective and fraction of the cylinder arc composing each lenticulation, so that the emulsion area behind each lenticulation is completely filled and there is no overlap of the exposed zone from one lenticulation to the next adjacent one.

A picture taken by the above-described process and/or with the above-described embodiments of the present invention in which the subject is rotated comprises a plurality of adjacent interleaved image portions upon the photographic medium which, when viewed biocularly, produces a three-dimensional effect. Inasmuch as the line-of-sight from each eye of a viewer is incident upon the photographic medium, or lenticulations of the screen or grid upon the film at slightly different angles, each retina will, thus, receive slightly different aspects of the original subject because of the rotation of the subject while the picture sequence is being recorded at a continuously changing angle of incidence. The two slightly different images are fused in the visual cortex enabling the observer to perceive a three-dimensional object by the same mechanics as if the three-dimensional object were actually present. As a supplement to the phenomena of retinal disparity noted immediately above, a second effect further enhances the perception of depth. As either one or both eyes of an observer scans the photographic media from differing viewpoints, there results a changing parallax for corresponding points, so that it is possible for the viewer to apparently see the photographed object from different angles; and, in fact, to actually see around portions of the subject.

Figure 3:
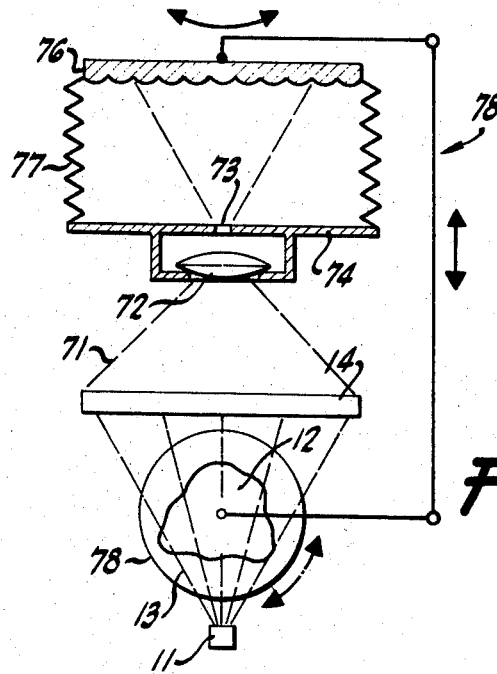

It is also possible to accomplish a portion of the objectives of the present invention in a manner superficially similar to prior art approaches to the problem in that there is provided a synchronous rotation of the film about an axis parallel to those of the lenticulations while providing for relative rotation of subject and the combination of source and transducer. This arrangement has the disadvantage of requiring rather complex linkage arrangements, such as illustrated and described in the above-noted Bonnet patent; however, the present invention does provide for production of suitable radiographs therefrom by the utilization of a narrow aperture for directing light from the objective onto the photographic medium. This, together with the employment of an efficient transducer which not only faithfully reproduces incident radiation in the form of photographic light, but, furthermore, intensifies the light, overcomes the difficulties of the prior art in directing sufficient light upon the photographic medium to produce sharp, readable pictures. Referring to FIG. 3 there is illustrated a rotative system. The embodiment of FIG. 3, in brief, includes the radiation source 11 disposed on one side of a subject 12 and emitting penetrating radiation 13 of the type described above. A transducer 14 disposed on the opposite side of the subject 12 from the source 11 produces photographic light, in general, indicated by the rays 71 which are focused by an objective lens 72 through a slit aperture 73 in a fixed plate 74. A photographic medium 76, of the type generally described above, is disposed on the opposite side of the plate 74 from the objective 72, and is mounted for angular rotation about an axis normal to the paper and lying in the film plane parallel to the axis of the lenticulations. Bellows, or the like, 77 interconnect the photographic medium in plate 74, so as to maintain a lighttight enclosure between the plate and photographic medium. It is to be appreciated that in all embodiments of the present invention extraneous light is excluded from the embodiments hereof between the transducer 14 and photographic end of the apparatus by means not shown. In this embodiment suitable pivoting or rotational means and linkage 78 are provided interconnecting the photographic medium 76 and the subject 12, or a table or the like, 78, upon which same may be mounted. Reference is again made to the prior art for suitable pivotable linkage that may be employed in this respect; and, it is noted that under certain circumstances it is necessary for the photographic medium and subject to be rotated in opposite directions in order not to reverse the radiograph. While this embodiment of the present invention, in many respects, resembles prior art apparatus for depth-perception radiography, it is particularly noted that a critical and essential difference stems from employing a very narrow aperture so as to provide a continuous sequence of views of the subject, which views are progressively changing with time, to be recorded sequentially without overlap on the emulsion. This may be alternatively stated as limiting the aperture width, laterally of the lenticulations, so that the instantaneous image thereof focused on the emulsion has a width that is a small fraction of the width of the lenticulation. A further advance afforded by this invention lies in the elongation of the aperture axially of the lenticulations so as to maximize the amount of light available for exposing film. In this manner it is possible to produce a continuous time sequence of views of the subject while it is being rotated in a beam of penetrating radiation so that the two eyes may at a later time, but simultaneously, view slightly different aspects of the subject and satisfy the condition of retinal disparity. Also, if the pair of eyes are moved so as to observe the photograph from a different angle, a wholly new pair of views are presented to the respective retinas. This changing parallax effect distinguishes depth perception from conventional stereoscopy.

Certain portions of the present invention are worthy of particular note and emphasis, particularly with regards to possible variations therein. It is, thus, specifically noted that the photographic medium is susceptible to a wide variation in configuration. It is not necessary the photographic medium be planar; but, instead, it may, for example, be cylindrical, and this configuration finds particular application in various circumstances. Furthermore, the displacement grid or screen upon the front surface of the film of the photographic medium may take a wide variety of configurations as generally described above. Particularly in the instance wherein the displacement grid comprises closely spaced spherical lenses, it is noted that relative movement of a circular light aperture should be circular in a plane perpendicular to the line-of-sight of the apparatus, rather than in a single lateral direction, as described in connection with particular preferred embodiments of this invention. It is, additionally, noted that the radiant energy employed to penetrate the subject may take a variety of forms such as sonic, ultra-sonic, visible light, ultra-violet, infra-red, radio frequency, x-ray, gamma ray, nuclear particles and the like. It is only required that this radiation be of such a nature as to be partially absorbed, attenuated, diffused, dissipated or altered in passage through the subject in proportion to the path length traversed and the chemical or physical properties thereof.

There has been described above method and apparatus for producing depth-perception photographs of three-dimensional subjects which are opaque to visible light, which is highly advantageous in the field of radiography, not only in improved results, but, also, in simplification of prior art approaches to the problems involved in this field. The present invention is particularly advantageous in the field of medicine and the results obtainable herewith allow the radiologist to look around as well as through the discontinuities within the subject, much as though a glass model of the subject were being examined. Although the present invention has been described above in connection with particular preferred steps in the process hereof and in terms of a particular preferred embodiment of the apparatus of the present invention, it is not intended to limit the invention to the exact terms of the description or details of illustration. Instead, reference is made to the appended claims for a precise delineation of the true scope of the present invention.

I claim:

1. A process of depth-perception radiography comprising the steps of:
   a. irradiating a subject with a penetrating radiation that has the intensity thereof affected in passage through the subject;
   b. transducing radiation emerging from the subject into photographic light emanating from a plane surface and proportional in intensity to incident radiation at a corresponding point on the opposite side of the surface;
   c. focusing said photographic light from step *b* through a small aperture upon a photographic medium having a displacement grid on the front surface thereof;
   d. casting a changing radiation pattern of the subject upon a transducing plane of step *b* by relatively rotating the subject and the combination of the radiation source and transducer which are fixed with respect to each other; and
   e. changing the angle of incidence of light on said photographic medium in synchronism with step *d*, to focus a plurality of images in interleaved portions upon said photographic medium for individual retrieval.

2. The process of claim 1 further defined by said displacement grid having transparent cylindrical lenticulations, and said rotation being about an axis parallel to the axis of said lenticulations.

3. The process of claim 2 further defined by changing the angle of incident light by laterally moving a narrow, elongated slit aligned parallel to the axes of said lenticulations.

4. The process of claim 3 further defined by moving said slit aperture across a large objective lens focusing light upon said photographic medium.

5. The process of claim 3 further defined by moving a small objective lens and said narrow, elongated slit aperture together laterally of said lenticulations.

6. The process of claim 2 further defined by rotating both said photographic medium and the subject in synchronism while focusing light on the photographic medium through a narrow elongated slit parallel to said lenticulations.

7. The process of depth-perception radiography as set forth in claim 1 further defined by continuously changing the radiation pattern of the subject in step *d* whereby continuously varying images are focused upon said photographic medium.

8. The process of depth-perception radiography as set forth in claim 1 further defined by changing the radiation pattern of the subject upon the transducer plane in discrete increments in step *d* whereby successive juxtaposed images are focused upon the photographic medium.

9. Apparatus for depth-perception radiography comprising:
   a. a source of penetrating radiation;
   b. means for mounting a subject in front of said source;
   c. a transducer disposed on the opposite side of said subject from said source and producing photographable light from incident radiation;
   d. a photographic medium having a displacement grid on a front face thereof;
   e. an objective lens focusing light from said transducer on the front face of said photographic medium;
   f. means maintaining the source and transducer in fixed relation relative to each other and relatively rotating same with respect to said subject; and
   g. means scanning a narrow aperture across said photographic medium to direct light from different angles thereon to record an image having juxtaposed and separable interleaved image portions.

10. The apparatus of claim 9 further defined by said displacement grid comprising cylindrical lenticulations parallel to said slit, and the means of *g* including a plate with a slit therein and an objective lens over said slit and means moving both plate and lens laterally across said lenticulations.

11. The apparatus of claim 9 further defined by said displacement grid having parallel transparent lenticulations on a light intercepting face thereof, said relative rotation being provided about an axis parallel to the axis of said lenticulations and said aperture having a width less than that effecting exposure of one-half of the photographic medium behind each lenticulation.

12. The apparatus of claim 9 further defined by the medium *d* comprising parallel cylindrical transparent lenticulations upon a light-intercepting face of photographic emulsion, and said narrow aperture having a limited maximum dimension laterally of the lenticulations so that an instantaneous image thereof focused on said emulsion behind each lenticulation has a width limited to a small fraction of the width of the lenticulation.

13. The apparatus of claim 12 further defined by said narrow aperture being elongated parallel to the axes of lenticulations to maximize light focused on said photographic medium.

14. The apparatus of claim 9 further defined by the means *g* including means defining a narrow aperture between said objective lens and said photographic medium and means rotating said photographic medium *d* and means *b* mounting a subject in synchronism while maintaining the remainder of the apparatus fixed with respect thereto for directing light from different angles onto said photographic medium.